United States Patent [19]

Anderson

[11] Patent Number: 5,120,480
[45] Date of Patent: Jun. 9, 1992

[54] METHOD FOR MAKING CONTAINERS USING A MODULAR MOLD SYSTEM

[76] Inventor: Bruce J. Anderson, 1401 Westview Dr., Naples, Fla. 33942

[21] Appl. No.: 452,372

[22] Filed: Dec. 19, 1989

[51] Int. Cl.$^5$ .............................................. B29C 41/20
[52] U.S. Cl. ................................ 264/46.5; 264/137;
264/219; 264/257; 264/261; 249/149; 249/156;
249/166; 249/192
[58] Field of Search .............. 249/149, 156, 163, 165,
249/166, 184, 192; 264/135, 136, 137, 219, 225,
257, 258, 261, 46.5

[56] References Cited

U.S. PATENT DOCUMENTS

| | | | |
|---|---|---|---|
| 2,802,766 | 8/1957 | Leverenz | 264/257 |
| 2,864,150 | 12/1958 | Henderson | 249/156 |
| 2,874,442 | 2/1959 | Henderson | 25/118 |
| 2,993,822 | 7/1961 | Reeves | 264/257 |
| 3,329,546 | 7/1967 | Scheinert | 264/257 |
| 4,123,034 | 10/1978 | Crunk et al. | 249/156 |
| 4,151,976 | 5/1979 | Schurman | 249/102 |
| 4,251,196 | 2/1981 | Toffolon | 249/160 |
| 4,289,717 | 9/1981 | Bortz | 264/257 |
| 4,318,679 | 3/1982 | Moore | 249/160 |
| 4,351,507 | 9/1982 | Toffolon et al. | 249/160 |
| 4,525,133 | 6/1985 | Bergmann | 425/120 |
| 4,639,345 | 1/1987 | Olsen | 425/175 |

Primary Examiner—Jay H. Woo
Assistant Examiner—Jeremiah F. Durkin, II
Attorney, Agent, or Firm—Roland H. Shubert

[57] ABSTRACT

A modular mold system for making molds in a range of incrementally different sizes is provided as is a method for using that system in the manufacture of containers. The mold system includes corner elements, edge angle elements and spacer elements which can be interlocked together through connecting means to form a mold for a container. The boundaries of each mold element are defined by straight lines meeting at right angles and each mold element has at least one common dimension with every other element. The mold system is particularly adapted for use in making fiberglass reinforced products such as insulated containers having an inner shell and an outer shell with insulation between the shells.

8 Claims, 5 Drawing Sheets

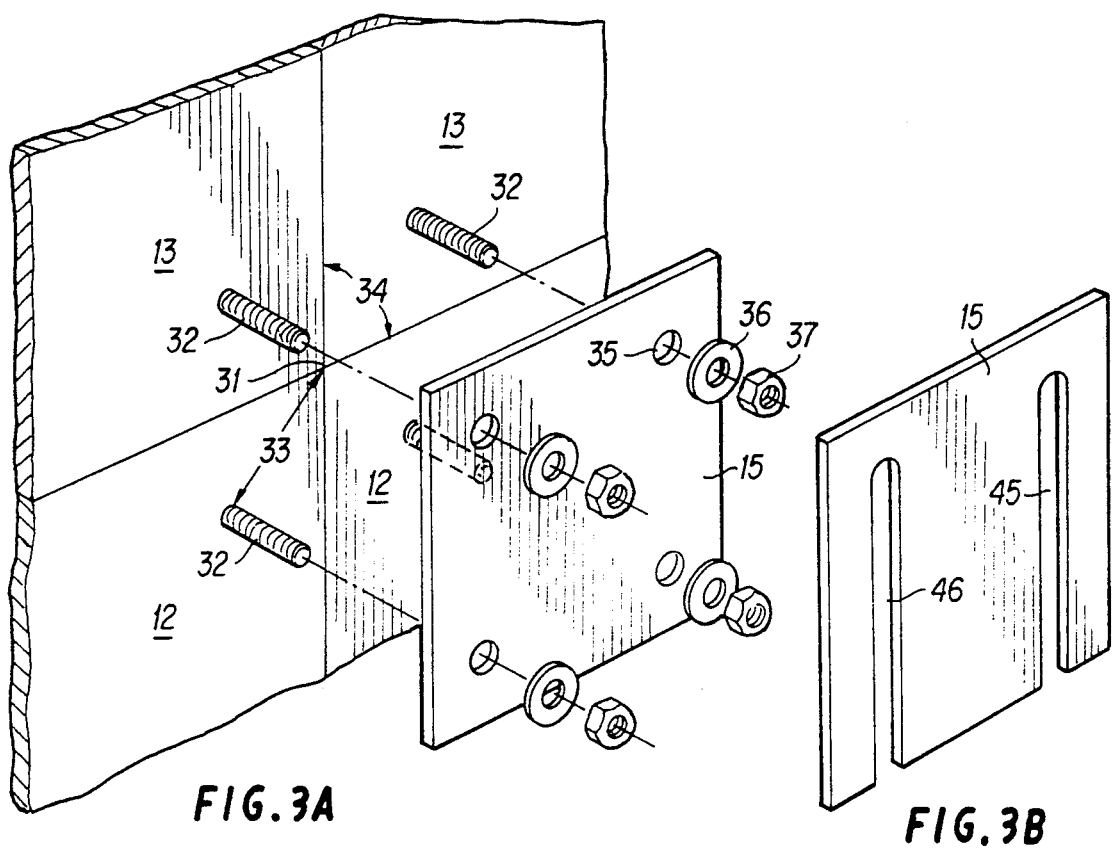
FIG.3A
FIG.3B
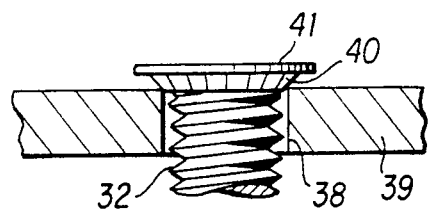
FIG.4
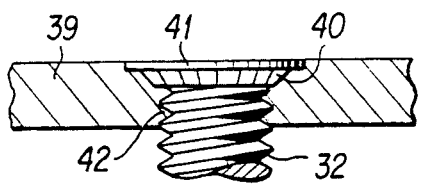
FIG.5
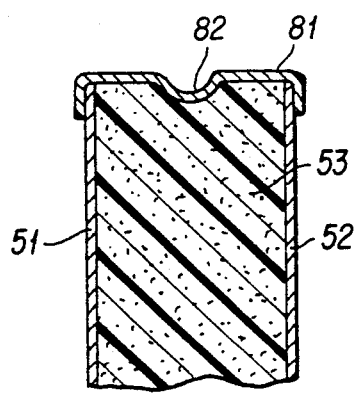
FIG.12
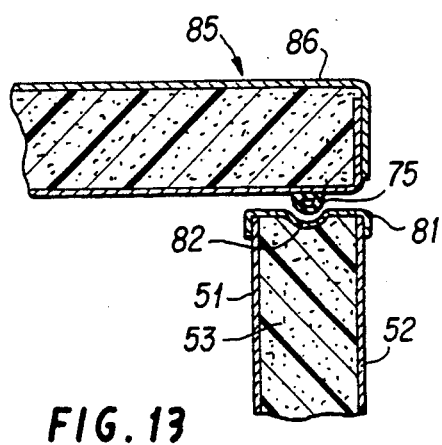
FIG.13

METHOD FOR MAKING CONTAINERS USING A MODULAR MOLD SYSTEM

BACKGROUND OF THE INVENTION

1. Field of the Invention

This invention relates generally to a modular mold system for the forming of shaped members of similar design but of different dimensions and to a method for using that mold system to produce such shaped members.

More particularly, this invention relates to a modular mold system in which interlocking components are assemblable in different arrangements to form molds of varying dimensions but of similar configuration. The system is particularly adapted to the production of glass fiber reinforced resin products including, for example, containers having an inner and outer shell with insulation placed therebetween.

2. Description of Related Art

It is known in the art to provide molds having a plurality of mold surfaces which are either added to or removed from the mold in order to vary the product size or shape. One such system is shown by U.S. Pat. No. 4,151,976 to Schurman which describes a modular die set for use in blow molding to form containers of similar design but of different dimensions. The die set includes closable die halves made up of die elements arranged so that each element controls only two of the three dimensions of the die cavity. Substitution of different die elements allows the manufacture of products differing in size without requiring complete die sets for each product. The system is particularly adapted for the manufacture of customized blow molded plastic cases.

Adjustable forms are often used in the making of concrete structures such as box culverts and the like and one such system is illustrated by the Crunk et al patent, U.S. Pat. No. 4,123,034. That patent shows a form which includes a pair of wall sections held together with a pair of corner units which are removable from the wall sections. Different sized products are obtained by removing one corner unit and substituting another of a different size. The system as described has no provision for varying the vertical dimension of the mold.

Adjustable mold structures have also been used in packaging systems as is described, for example, in U.S. Pat. No. 4,525,133. That patent shows a packaging system having an outer shell which has a base, a top, and side walls which can be adjusted in dimension to provide an enclosure of desired size. An article to be packaged is placed within the enclosure and a foaming material is injected into the space between the article and the inner walls of the enclosure.

All of the above described mold systems have significant disadvantages were they to be used in the manufacture of glass fiber reinforced resin products of different dimension but of similar design; particularly those products of the type having an inner shell and an outer shell.

SUMMARY OF THE INVENTION

A mold system for use in the manufacture of glass fiber reinforced resin products and the like is made up of interlocking modular components or elements which can be assembled to form molds for products having a similar design but a large range of dimensions. The modular elements are fabricated of metal or other high strength material and include means allowing each of the elements to be rigidly but detachably joined to an adjacent element either of the same or of different configuration. Addition or subtraction of elements allows the dimensions of the mold to be incrementally changed over a wide range. The system is particularly useful in the making of molds for the manufacture of insulated containers in a range of sizes.

Hence, it is an object of this invention to provide a modular system to produce molds which can be incrementally changed in size.

It is another object of this invention to provide molds made of modular elements which can be easily disassembled so as to provide easy removal of the mold from the molded piece.

A specific object of this invention is to provide a method for making molds in a range of incremental sizes and to provide a process for the use of those molds in the manufacture of glass fiber reinforced resin containers.

Other objects and advantages of the invention will become apparent from the following disclosure.

BRIEF DESCRIPTION OF THE DRAWING

Exemplary embodiments of the invention are illustrated in the drawing in which:

FIG. 3-A is an exploded view showing an arrangement for joining mold components;

FIG. 3-B shows an alternative arrangement of the junction plate of FIG. 3A;

FIG. 4 is a detail view of a locking stud of the FIG. 3 arrangement before installation;

FIG. 5 is a detail view of the locking stud of FIG. 4 after installation;

FIG. 12 is a partial sectional view of a container wall topped by a sealing groove;

FIG. 13 is a partial sectional view of the container wall of FIG. 12 showing its association with the container lid.

DETAILED DESCRIPTION AND DISCUSSION OF THE INVENTION

Figure 1:
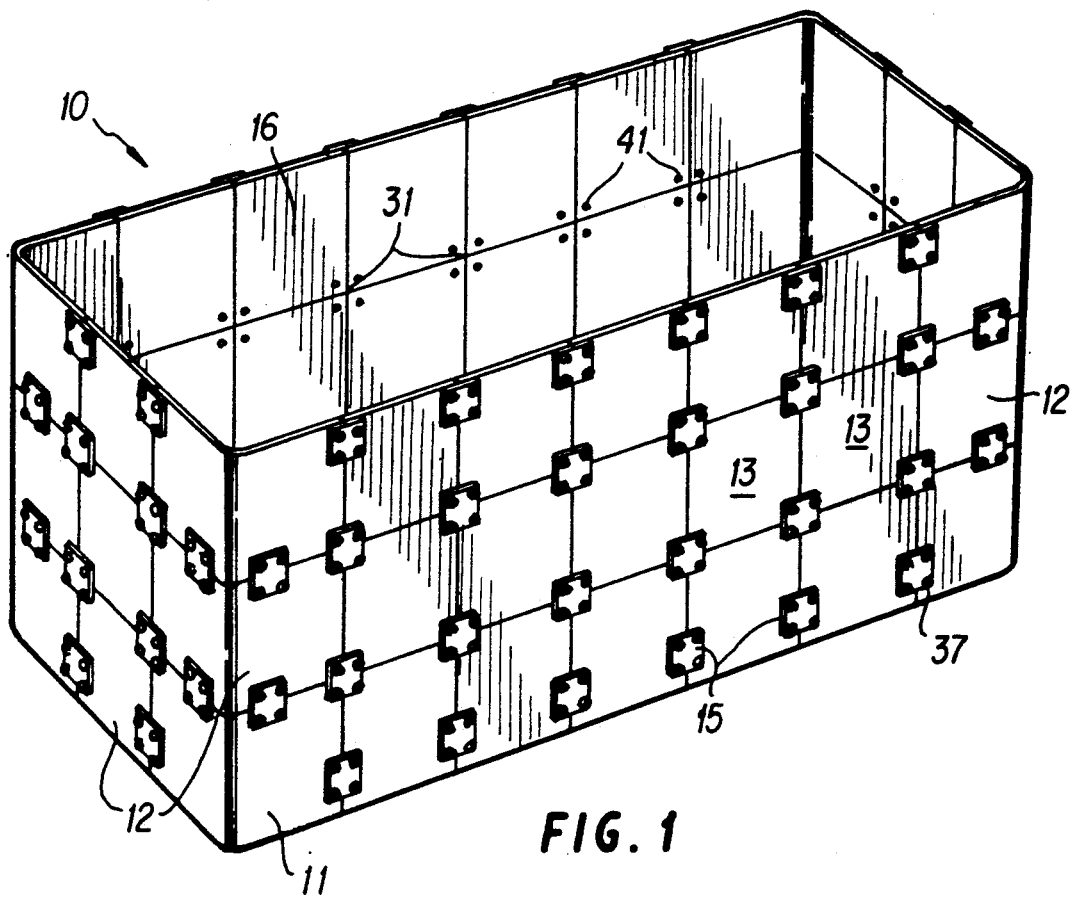
FIG. 1 is a perspective view of an outer shell mold used in making a container in accordance with the invention.

The mold system of this invention is useful in the manufacture of glass fiber reinforced resin products and the like. It provides particular advantages in the manufacture of products having a similar design but differing dimensions as, for example, container members of varying capacity.

It will be useful to review the conventional methods of mold making for the manufacture of glass fiber reinforced resin products in order to fully appreciate the advantages brought to the art by this invention. The conventional approach to making a mold for glass fiber reinforced resin products requires several laborious steps. Often the mold itself is constructed from glass fiber reinforced resin and, in these instances, the starting point is a structure called a plug which conforms in size and shape to the desired piece or product. The mold, in turn, is shaped on or molded on the plug. Any material which is easily shaped, which can be given a non-porous surface, and which can support modest weight or pressure without deformation is suitable for use in making the plug. Wood is commonly used for plug making as is plaster and even cardboard and sheet metal.

After the plug has been formed to the desired shape, the plug surface is carefully finished. Surface finishing ordinarily includes sanding to a smooth surface followed by sealing as with a shellac or similar material. Multiple coats of lacquer primer followed by lacquer are then applied with sanding between coats to obtain a high quality surface. Next, a mold release agent or separator is applied to the plug so that the mold can be removed from the plug. Mold release agents are well known and typically comprise a wax followed by a polyvinyl acetate film applied by spray or pad.

The first step in making the actual mold is to apply a gel coat to the plug surface. The gel coat must be carefully applied as it will form the surface of the mold and will thus determine the quality of the pieces or product subsequently produced by use of the mold. A skin lamination, typically a glass fiber mat, is applied with molding resin after the final gel coat has had a few hours to cure. The mat must be cut and fitted to conform with the contours of the plug and all air must be worked out so that the mat is tight against the plug surface and is saturated with resin. That first lamination is allowed to cure for several hours and is then followed with a second mat which is applied in the same fashion. The same procedure is followed with successive laminations using either glass mat or glass fabric until the desired mold thickness is achieved. After allowing the mold time to thoroughly cure, it is removed from the plug and bracing is often constructed around the mold to keep it from distorting.

The mold is now ready for use. A mold release agent, or separator, is first applied to the mold surface. Then a gel coating, often pigmented to give a pleasing appearance, is applied as before. Finally, successive laminations are applied to the mold surface employing the same techniques and using the same care as in making the mold. The mold is, of course, reusable but does have a limited life. Molds that are to be used for extended production runs are commonly constructed of epoxy resins rather than from glass fiber reinforced resin. As can now be appreciated, the conventional approach to making a mold is a rather formidable task. But an even greater shortcoming lies in the circumstance that a conventional mold can be used only to make a single piece or product of set and defined dimensions.

The invention will be illustrated throughout the following disclosure in the making of an insulated container having an inner and an outer shell with foam insulation between the shells. That container requires five separate molds; one for the outer shell; one for the inner shell; one for the sealing groove; one for the lid top; and the last for the lid bottom. Using conventional technology, a complete set of five molds is required for each container size produced. In contrast, the present invention allows each of the five molds of the set to be incrementally expanded or contracted so that a large range of container sized may be produced using a single mold set.

Referring now to the drawings, FIG. 1 is a perspective view of the outer, or female, shell mold shown generally at 10. Shell mold 10 is made up of three different elements; corner pieces 11, edge angles 12, and common spacer plates 13. The three elements, corner pieces, edge angles and spacer plates, have at least one dimension in common and are shaped such that the boundaries of each of the elements are defined by straight lines meeting at right angles to form corners. That geometry allows the assembly of the various elements in abutting relationship to form molds varying in size incrementally over a large range. Assembly is accomplished by arranging corners of four elements together at a point 31 and the elements are secured in that position by means of a junction plate 15 shown in detail in FIG. 3A. Because the mold 10 is a female mold and is used to mold a piece, in this case the outer shell of a container, on the inside surface thereof, the juncture plates 15 are arranged on the outer surface of the mold leaving a smooth inner surface 16.

Figure 2:
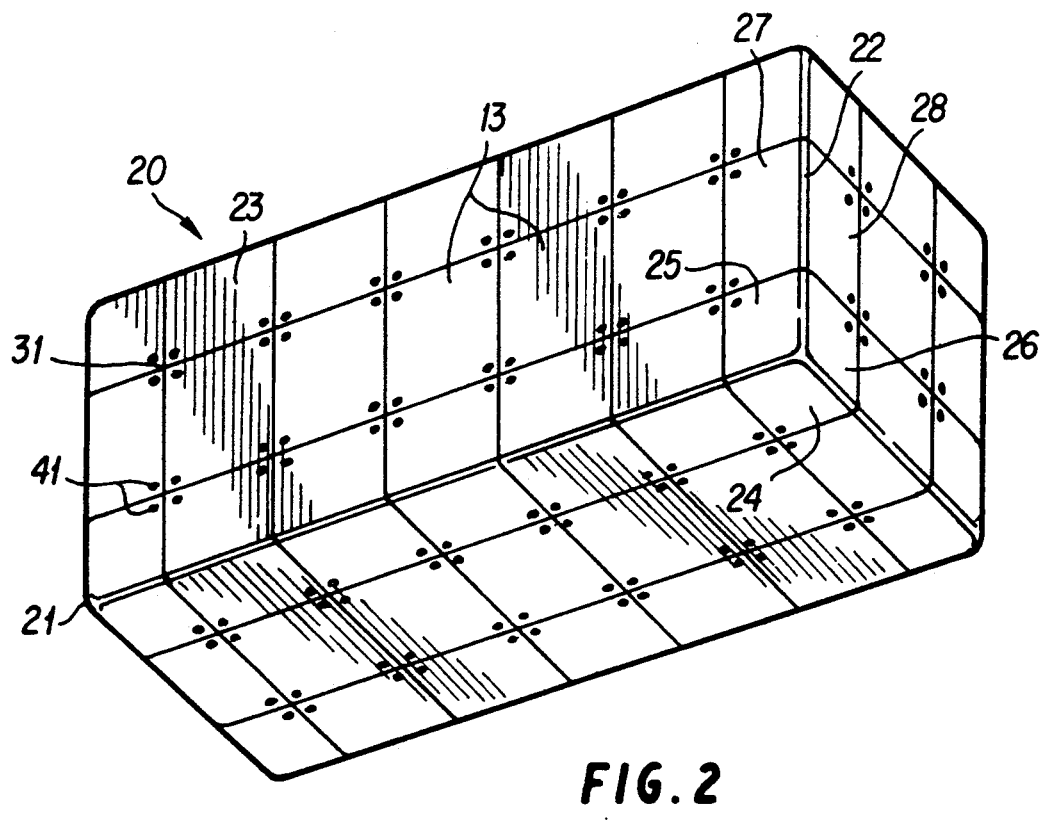
FIG. 2 is a perspective view of an inner shell mold.

FIG. 2 depicts in a perspective view a male mold 20 which is used to mold the inner shell of a container. As with mold 10, mold 20 is made up of three different elements; corner pieces 21, edge angles 22 and common spacer plates 13. The elements making up the mold are assembled and secured with junction plates in the same manner as with mold 10 except that the junction plates are arranged on the inner surface of the mold (not shown in this view) leaving a smooth outer mold surface 23.

Corner element 21 includes a base 24 and two sides 25 and 26. Sides 25 and 26 are of equal height, are positioned adjacent one another, and are arranged at right angles to each other and to base 24. Edge angle elements 22 include leg members 27 and 28 which are of equal width and are positioned at right angles to each other. As can be appreciated, the corner pieces and edge angles of female mold 20 are identical in geometry to their counterparts of male mold 10 except for the fact that junction plates 15 are arranged to be attached on opposite sides of the respective elements. Spacer plates 13 are completely interchangeable between the two molds.

Looking now at FIGS. 3-A, 3-B, 4 and 5 as a group, there is shown one preferred securing arrangement for joining mold elements together. That arrangement provides connecting means adapted to securely but detachably join any mold element to another mold element along a plane as well as to join four abutting elements together. Referring first to FIG. 3-A, which is an exploded view of the securing components, there is shown four mold elements arranged so that a corner of each element meets at a point 31. For purposes of illustration, those four mold elements may be as depicted in FIG. 1 and include two common spacer plates 13 joined to two edge angles 12. Each mold element has a stud 32 fixedly mounted therein at a fixed distance 33 from each corner point on a line bisecting corner angle 34 and projecting perpendicularly outward from the surface of the element. Junction plate 15 has four bored holes 35 uniformly spaced so as to mate with studs 32 of four mold elements when those elements are arranged with a corner of each element meeting at a point as is shown. The elements are secured together by fitting junction plate 15 over the projecting studs 32 and thereafter installing a washer 36 and a nut 37 on each stud. The drawing illustrates washer 36 and nut 37 as two separate pieces. A flange nut, which is essentially a nut with a washer attached thereto, may be used instead and does provide the advantage of less parts to handle.

FIG. 3-B shows an alternative structure of junction plate 15 which may be used to advantage in certain instances. In this embodiment, the four bored holes 35 in plate 15 are replaced by two parallel slots, 45 and 46, which extend from one edge of the plate to the most distant of the holes and have a width equal to the diameter of the holes which they replace. Use of the slotted junction plates rather than those with bored holes allows faster assembly and disassembly of the molds since the nuts simply have to be backed off slightly to obtain plate removal rather than being completely removed from studs 32. After the nuts have been loosened, the slotted plate can be slipped in or out.

FIGS. 4 and 5 depict a press-in, self-locking stud 32, sold under the trademark THREADSTUDS, which may be used to advantage in this invention as it provides for easy installation and a head surface which is flush with the plate surface after installation. A flush installation is, of course, necessary in order to provide a quality mold surface. As shown in FIG. 4, a hole 38 having a diameter slightly larger than the threaded portion of press-in stud 32 is bored through a mold element 39 shown here in partial section. Teeth 40 are provided at the bottom side of stud head 41. When the stud 32 is pressed into place in element 39, teeth 40 bite into the edges of the hole 38 to force metal 42 into thread grooves and so lock the stud into place as is shown in FIG. 5. Element 39 may be any one of the mold elements depicted in the drawing such as, for example, edge angle 12 or spacer plate 13 of FIG. 1. While a press-in stud of the type described is preferred for use with the mold elements of this invention, other fastening means or techniques which provide a fixed stud or similar fastening means and which allow a flush mold surface may be used as well.

In the embodiment described, that is a mold set for the manufacture of an insulated container having an inner shell and an outer shell with foam insulation therebetween, the female mold of FIG. 1 is used to produce the outer shell while the male mold of FIG. 2 is used to make the inner shell. A desirable first step in using the molds is to mask all seams between mold elements with a chemical resistant tape. The tape covers minor tolerance differences between adjacent elements and produces a better looking product. A mold release agent is then applied to the entire mold surface followed by application of a gel coat as was earlier described in relation to the conventional methods of mold making. Thereafter, successive laminations of glass matting or fabric with resin are applied in conventional fashion.

Figure 6:
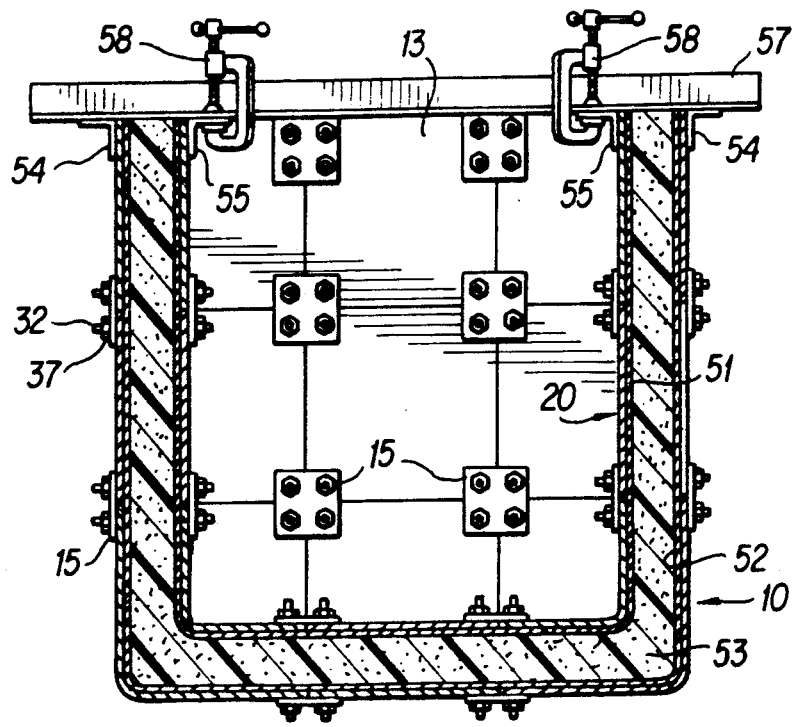
FIG. 6 is a cross-sectional view of an inner and an outer mold shell aligned and clamped in position with a core material therebetween.
Figure 7:
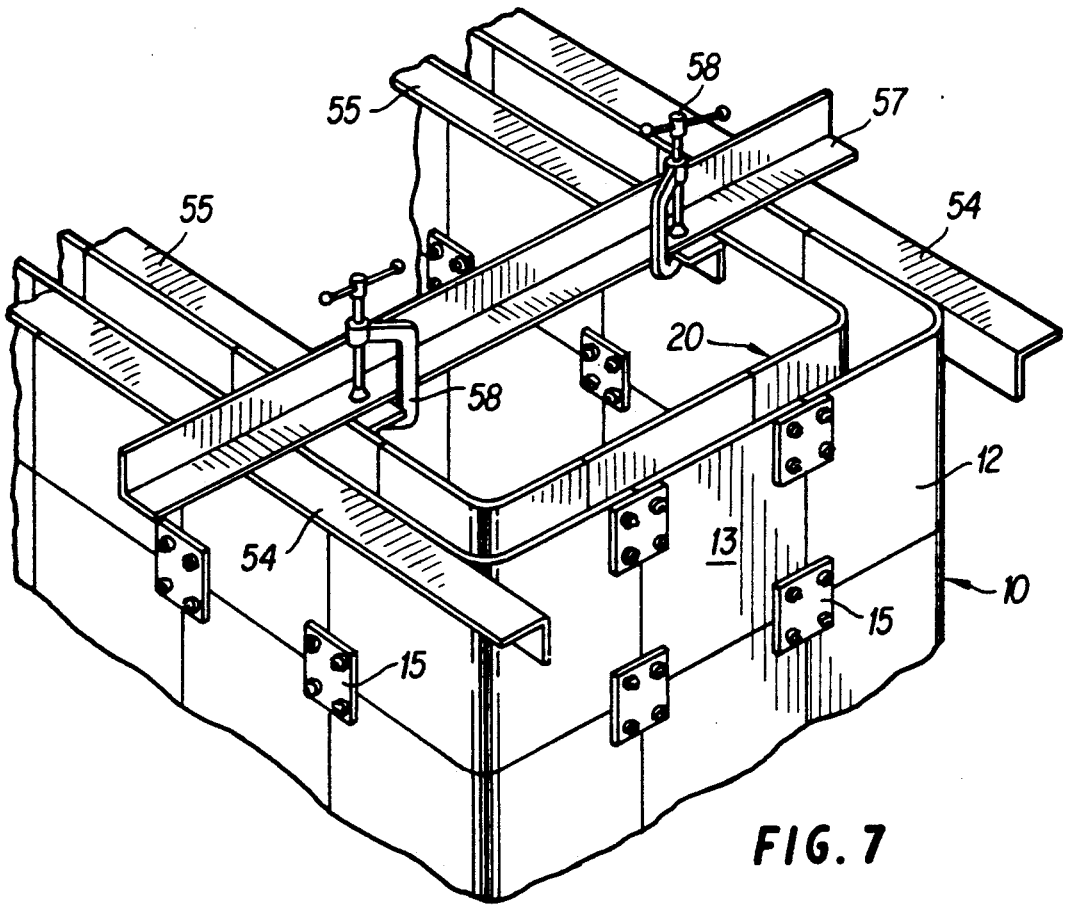
FIG. 7 is a top perspective view of an inner and an outer mold shell showing an alignment and clamping arrangement.

After lay-up is complete and curing is finished the molds, each with the laminate or shell still in place, are assembled as is shown in FIGS. 6 and 7. Referring first to FIG. 6, there is shown a sectional view of the inner shell mold 20 with shell laminate 51 thereon and outer shell mold 10 with molded shell laminate 52 still in place. The shell molds 10 and 20 are aligned in a uniformly spaced apart attitude and the cavity between the inner molded shell laminate 51 and the outer molded shell laminate 52 is filled with an insulating material 53 which is preferably a foamed in place polymer such as foamed polyurethane or the like.

As may be appreciated from a consideration of the assembled inner and outer shell molds as depicted in FIG. 6, an allowance must be made in the dimensions of the mold components making up the two shell molds in order to obtain the necessary spacing to accommodate the insulating material 53 between the inner and outer shells. That spacing is obtained by adjusting the dimensions of one or more of the mold elements. Any convenient unit dimension for mold elements may be selected. For example, it has been found generally useful in the manufacture of insulated containers to size common spacer plates 13 at six inches on a side allowing incremental dimension changes in length, width and height of six inches. A total container wall thickness, including insulating material 53, is appropriately set at two inches. In this instance, then, all three mold elements including corner piece 11, edge angle 12 and spacer plate 13 of the outer shell mold 10 depicted in FIG. 1 would have a common dimension of six inches. In order to obtain the necessary spacing between molds for the insulation, some of the dimensions of the components of the inner shell mold 20 must be adjusted. Only one component, spacer plate 13, is common to both the inner and outer shell molds and that commonality can be maintained by changing the dimensions of corner piece 21 and edge angle 22 of mold 20. In order to accommodate the two inch container wall thickness, corner piece 21 can be dimensioned at four inches on a side and edge angles 22 can be made six inches in width with each leg being four inches in length. Of course, other unit dimensions may be selected and the dimensions of the mold components adjusted accordingly to provide for any desired change in incremental dimension and container wall thickness.

As is shown in both FIGS. 6 and 7, angle members 54 may be attached along the outside top of outer shell mold 10 using the top row of studs for that purpose. Likewise, angle members 55 may be attached in a similar fashion to the inside of inner shell mold 20. Angle members 54 and 55 serve two purposes. First, they provide a convenient means to position and secure the inner shell mold within the outer shell mold in a uniform spaced apart attitude for the injection of the foam insulation. Second, the angle members provide a reinforcing and stiffening means for the molds and laminate shells to provide rigidity and to prevent distortion of the molded shells during foam injection.

Inner shell mold 20 having laminate shell 51 still in place on the outer surface thereof is positioned within outer shell mold 10 which similarly has laminate shell 52 in place on its inner surface. A cross member 57, which may be an angle member as is shown, is laid across the top of outer shell mold 10 resting on angles 54. Inner shell mold 20 is then lifted so that the upper surface of angles 55 contact the lower surface of cross member 57 and angles 55 are then secured to member 57 as by use of clamps 58. After the two shell molds have been appropriately positioned and have been secured into place, a foam insulation 53 is generated and is allowed to fill the entire cavity across the bottom and along the sides of inner mold 20. As soon as the foam has set clamps 58 and cross member 57 may be removed as the foam now holds the inner and outer shells in fixed position one relative to the other.

Figure 8:
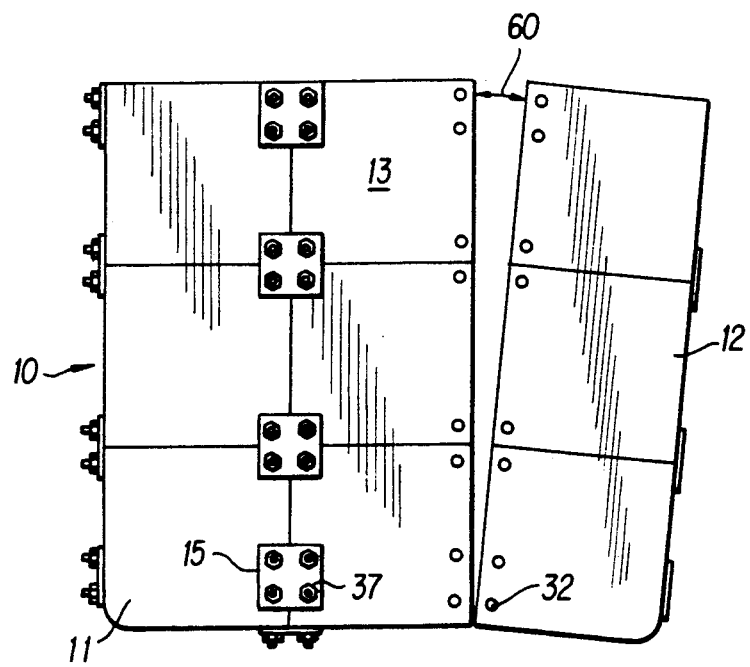
FIG. 8 is an end elevational view illustrating the partial disassembly of an outer mold shell for removal of a molded piece therefrom.

A mold ordinarily must be designed with a rake or taper in order to allow removal from the mold of a piece or product formed thereon. The molds of this invention, as for example outer shell mold 10 and inner shell mold 20, in contrast are formed with straight walls and have no rake or taper. Removal of the mold from the piece or shell laminated thereon is accomplished by a partial disassembly in the manner shown in FIG. 8. As is shown in that Figure, a vertical row of junction plates is removed from the ends of the outer shell mold 10 allowing the top of the mold to be sprung apart a short distance 60 and, in effect, creating a sufficient taper or rake to allow easy removal of the mold from the shell. The inner shell mold 20 may be removed in a somewhat analogous fashion except that it must be more completely disassembled. Junction plates are removed in a pattern which breaks the mold down into four parts; two side walls each with a portion of the bottom, and two end plates. There is obtained after removal of the molds an open topped container having inner and outer walls of fiber glass reinforced plastic with foam insulation between the walls.

Figure 9:
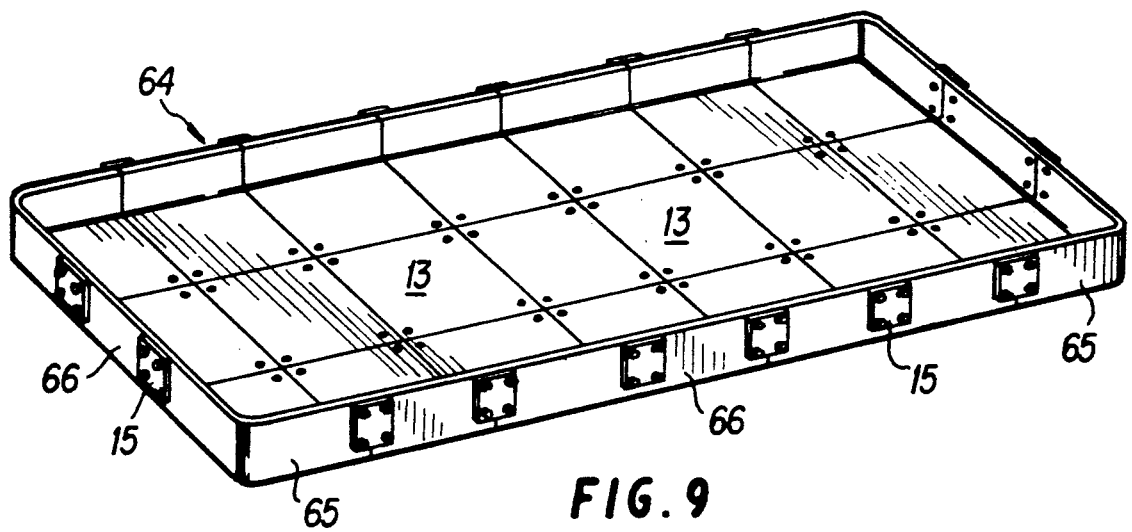
FIG. 9 is a perspective view of a mold shell for forming a container lid member.

A finished container requires an insulated lid and a sealing groove fixed atop the container walls. A separate mold must be provided for the fabrication of each of those pieces; the lid requiring two molds, one for the lid top and one for the lid bottom. A mold for the lid top is illustrated in FIG. 9. As is shown in that Figure, the lid top mold 64 requires three separate mold elements. Elements required are four corner members 65; a plurality of edge members 66, the precise number depending upon the dimensions of the lid; and common spacer plates 13. Note that by proper selection of the unit dimension, the same spacer plates 13 can be used in outer shell mold 10, inner shell mold 20 and the top and the lid top and lid bottom molds as well. The individual components making up lid top mold 64 are secured together using junction plates 15 in the same manner as was previously described.

The lid bottom mold (not illustrated) is essentially identical with the lid top mold except for a minor change in dimensions of certain mold components. The large dimensions of the corner members and edge members of the lid bottom mold are reduced by the thickness of the bottom lid, about one-eighth inch, so that the lid top can be assembled in overlap fashion with a bottom lid as is shown in FIG. 13.

Figure 10:
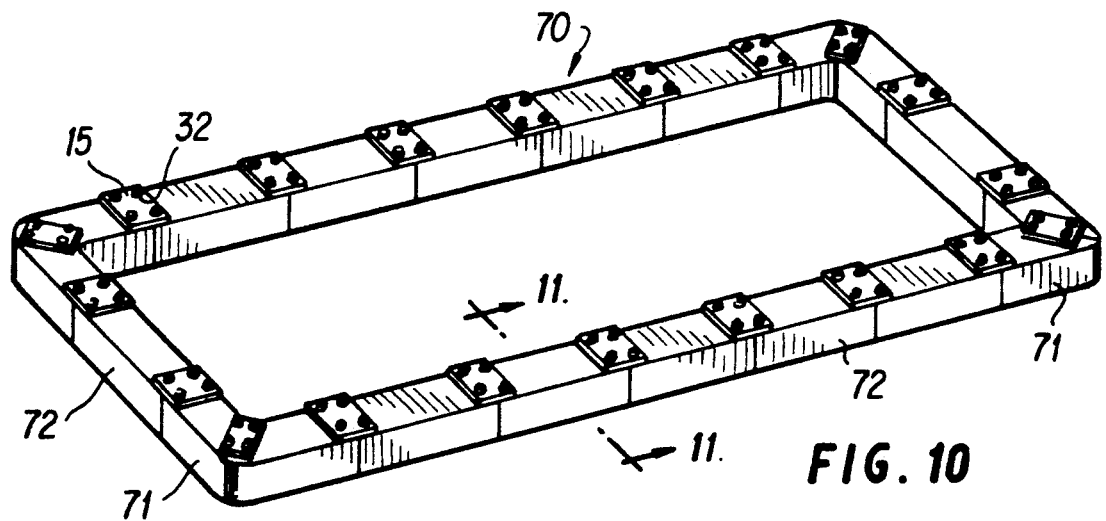
FIG. 10 is a top perspective view of a sealing groove mold.

A perspective view of sealing groove mold 70 is shown in FIG. 10. Mold 70 can be constructed using but two elements, corner members 71 and spacer members 72. Studs 32 are mounted adjacent the ends of each one of the mold elements and the mold elements are secured together using junction plates 15 in the manner illustrated in FIG. 3. The length of each spacer member 72 is preferably set at that unit dimension selected for the elements of outer and inner shell molds 10 and 20 and the number of spacer plates used is selected so that the mold size corresponds with the other container pieces.

Figure 11:
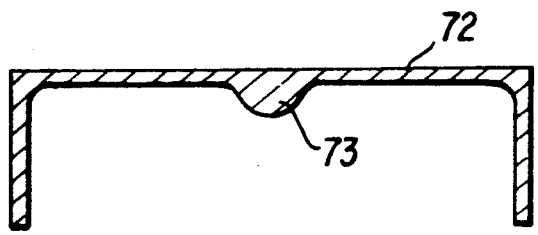
FIG. 11 is a cross-section taken along line 11—11' of FIG. 10.

A cross section of mold 70, taken along line 11—11' of FIG. 10, is shown by FIG. 11. Protrusion 73, which may conveniently be hemispherical in cross section, extends longitudinally around the entire mold to form a channel adapted to mate with a resilient "D" ring or other equivalent sealing means 75 (FIG. 13) and thus provide a seal between the container lid and body. Now, referring to FIGS. 12 and 13 in combination with the foregoing discussion of FIGS. 9, 10 and 11, there is shown in FIG. 12 a partial sectional view of a container wall topped by a sealing groove. The container wall is formed by outer shell 52 and inner shell 51 having foamed insulation 53 therebetween. The container wall is capped by sealing groove member 81 which has a channel 82 formed therein and is secured in place by means of a suitable adhesive. FIG. 13 is a partial sectional view of the container wall of FIG. 12 showing its association with the container lid 85. Lid 85 consists of a lid top 86 and a lid bottom 87 with an insulating material 88, preferably a foamed plastic, filling the cavity between the two. Resilient sealing means 75 is fixed to the underside of lid 85 and is positioned to fill channel 82 when the lid is in closed position atop the container wall.

Figure 14:
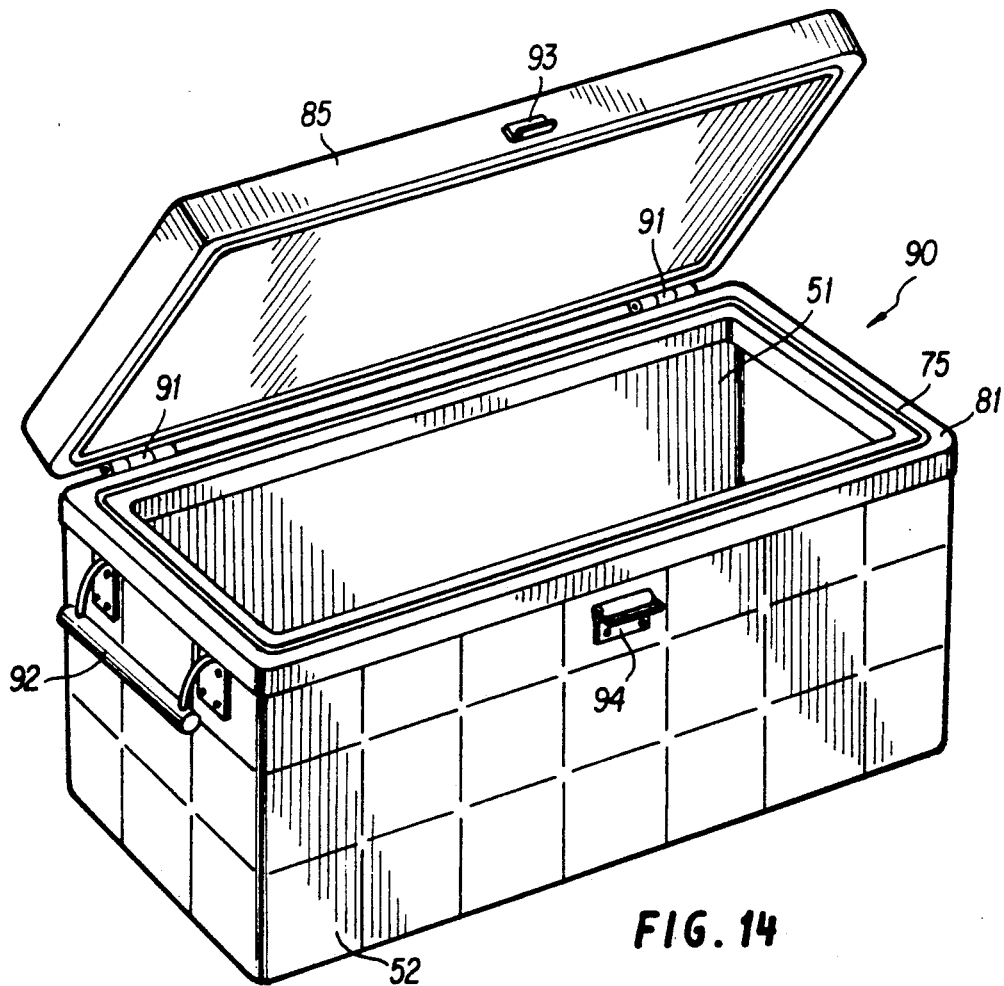
FIG. 14 is a view of an insulated container made with the mold members illustrated in the preceeding Figures.

FIG. 14 shows a finished container 90 constructed according to the teachings of this invention and using the mold system herein described. Lid 85 is attached to the container body by means of hinge members 91. Handles 92 may be attached to the ends of the container for convenience in lifting and carrying the container. Hook means 93 may be provided on the lid for connection with hasp 94 arranged on the outer container shell so that the container lid can be secured in a closed position.

While the invention has been illustrated through description of one preferred embodiment, the use of the mold system in the manufacture of an insulated container, the invention is of course not nearly so limited. As can be appreciated from the variety of shapes produced by the molds described and illustrated in the drawings, molds can be designed according to the teachings of this invention to produce any of a wide array of structural shapes in a large range of sizes. Further, the molds may be used to produce products other than those of reinforced glass fiber reinforced resin as will be obvious to those skilled in the art.

I claim:

1. A method for making glass fiber reinforced resin containers comprising:

providing a modular mold system having a plurality of mold elements arrangable to form a mold having a flat bottom and upwardly extending sides, said mold elements including a plurality of corner elements, a plurality of edge angle elements, and a plurality of spacer plate elements, the borders of each of said elements defined by straight lines meeting at right angles to form corners, each of said elements having at least one dimension common to each of said other elements, said system including connecting means arranged to securely but detachably join said mold elements one to another along a plane;

arranging four of said corner elements, a plurality of edge angle elements and a plurality of spacer plate elements to form a mold of a first size;

joining said mold forming elements to form a mold with said connecting means arranged on the exterior surface thereof;

arranging an additional number of corner elements, edge angle elements and spacer plate elements to form a mold of a second size generally symmetrical with but smaller than said first size mold;

joining said mold forming elements to form a mold with said connecting means arranged on the interior surface thereof;

applying a release agent to the inside surface of said first size mold and to the exterior surface of said second size mold;

applying laminations of glass fiber reinforcing material and resin to the release agent-coated mold surfaces to form shells and allowing said resin to cure;

arranging said second size mold with said glass fiber reinforced shell in place thereon within said first size mold but spaced apart therefrom to form a cavity therebetween, said first size mold also having said glass fiber reinforced shell in place thereon;

filling said cavity with an insulating material; and thereafter removing said molds from their respective shells to thereby form an open topped container having an inner shell and an outer shell separated by said insulating material.

2. The method of claim 1 wherein said insulating material is a foamed in place polymeric material.

3. The method of claim 1 including affixing a sealing member to said shells, said sealing member extending between the tops of said shells across said insulation-filled cavity.

4. The method of claim 1, including hingeably attaching a lid member to the outer shell of said container, said lid member arranged to cover the top of said container.

5. The method of claim 1 wherein said upwardly extending sides of said second size mold form a right angle with said mold bottom.

6. The method of claim 5 including facilitating the removal of said second size mold from its respective shell by detaching a plurality of connecting means and separating said mold into multiple parts and removing said parts from the shell.

7. The method of claim 1 wherein said upwardly extending sides of said first size mold form a right angle with said mold bottom.

8. The method of claim 7 including facilitating the removal of said first size mold from its respective shell by detaching a vertical row of connecting means from opposite ends of said mold and springing apart the top of the mold to create a taper allowing removal of the mold from its shell.

* * * * *